(12) United States Patent
Chikagawa (10) Patent No.: US 12,368,184 B2
(45) Date of Patent: Jul. 22, 2025

(54) SOLID STATE BATTERY

(71) Applicant: Murata Manufacturing Co., Ltd., Nagaokakyo (JP)

(72) Inventor: Osamu Chikagawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 647 days.

(21) Appl. No.: 17/697,347

(22) Filed: Mar. 17, 2022

(65) Prior Publication Data

US 2022/0238913 A1    Jul. 28, 2022

Related U.S. Application Data

(63) Continuation of application No. PCT/JP2020/038277, filed on Oct. 9, 2020.

(30) Foreign Application Priority Data

Oct. 11, 2019   (JP) ................................. 2019-187606

(51) Int. Cl.
*H01M 10/0562* (2010.01)
*H01M 10/0525* (2010.01)
*H01M 50/437* (2021.01)

(52) U.S. Cl.
CPC ... *H01M 10/0562* (2013.01); *H01M 10/0525* (2013.01); *H01M 50/437* (2021.01); *H01M 2300/0068* (2013.01)

(58) Field of Classification Search
CPC ........... H01M 10/0562; H01M 50/437; H01M 10/0525; H01M 2300/0068

(Continued)

(56) References Cited

U.S. PATENT DOCUMENTS 8,883,347 B2    11/2014    Baba et al.
9,263,727 B2    2/2016    Baba et al.
(Continued)

FOREIGN PATENT DOCUMENTS

JP    2008186595 A    8/2008
JP    2015220107 A    12/2015
(Continued)

OTHER PUBLICATIONS

International Search Report issued in PCT/JP2020/038273, date of mailing Dec. 15, 2020.

(Continued)

*Primary Examiner* — Allison Bourke
*Assistant Examiner* — Robert Gene West
(74) *Attorney, Agent, or Firm* — ArentFox Schiff LLP (57) ABSTRACT

A solid state battery that includes: a battery element including, along a stacking direction, one or more battery constituent units including a positive electrode layer and a negative electrode layer each having extended portions, and a solid electrolyte layer interposed between the positive electrode layer and the negative electrode layer; a first external terminal and a second external terminal that a respectively electrically connected to the positive electrode layer and the negative electrode layer; a protective layer covering a surface of the battery element; and a buffer portion surrounding at least one of the positive electrode layer and the negative electrode layer in the plan view, wherein at least a local portion of the buffer portion between a side surface of the electrode layer having the extended portion and the external terminal includes a resin-free insulating material substantially identical to a resin-free insulating material of the protective layer.

20 Claims, 5 Drawing Sheets

(58) Field of Classification Search
USPC .......................................................... 429/229
See application file for complete search history.

(56) References Cited

U.S. PATENT DOCUMENTS

| | | | |
|---|---|---|---|
| 11,050,091 | B2 | 6/2021 | Shimuzu et al. |
| 11,342,579 | B2 | 5/2022 | Takahata et al. |
| 2003/0040420 | A1 | 2/2003 | Larsen et al. |
| 2007/0042265 | A1 | 2/2007 | Tamai et al. |
| 2009/0061309 | A1 | 3/2009 | Ushio et al. |
| 2009/0162743 | A1 | 6/2009 | Nam et al. |
| 2009/0202912 | A1 | 8/2009 | Baba et al. |
| 2012/0015234 | A1 | 1/2012 | Iwaya et al. |
| 2014/0338817 | A1 | 11/2014 | Baba et al. |
| 2015/0213955 | A1 | 7/2015 | Lee et al. |
| 2019/0252728 | A1 | 8/2019 | Shimuzu et al. |
| 2019/0288246 | A1* | 9/2019 | Kato ................... H01M 50/548 |
| 2020/0106125 | A1 | 4/2020 | Yano et al. |
| 2020/0274194 | A1 | 8/2020 | Takahata et al. |
| 2020/0350524 | A1 | 11/2020 | Nakashima et al. |

FOREIGN PATENT DOCUMENTS

| | | |
|---|---|---|
| JP | 2016001600 A | 1/2016 |
| WO | 2007135790 A1 | 11/2007 |
| WO | 2018087970 A1 | 5/2018 |
| WO | 2018123319 A1 | 7/2018 |
| WO | 2018163514 A1 | 9/2018 |
| WO | 2018/181575 A1 | 10/2018 |
| WO | 2018181288 A1 | 10/2018 |
| WO | 2018186449 A1 | 10/2018 |
| WO | 2018235398 A1 | 12/2018 |
| WO | 2019176945 A1 | 9/2019 |

OTHER PUBLICATIONS

International Search Report issued in PCT/JP2020/038277, date of mailing Dec. 22, 2020.

Written Opinion of the International Searching Authority issued in PCT/JP2020/038277, date of mailing Dec. 22, 2020.

* cited by examiner

SOLID STATE BATTERY

CROSS REFERENCE TO RELATED APPLICATIONS

The present application is a continuation of International application No. PCT/JP2020/038277, filed Oct. 9, 2020, which claims priority to Japanese Patent Application No. 2019-187606, filed Oct. 11, 2019, the entire contents of each of which are incorporated herein by reference.

FIELD OF THE INVENTION

The present invention relates to a solid state battery.

BACKGROUND OF THE INVENTION

Conventionally, a secondary battery that can be repeatedly charged and discharged has been used for various applications. For example, secondary batteries are used as power sources of electronic devices such as smart phones and notebook computers.

In the secondary batteries, liquid electrolytes (electrolytic solutions) such as organic solvents have been used as media for moving ions. However, in a secondary battery using an electrolytic solution, there is a problem such as leakage of the electrolytic solution. Thus, development of a solid battery including a solid electrolyte instead of a liquid electrolyte has been proceeding.

Patent Document 1: WO 2018123319 A

SUMMARY OF THE INVENTION

The solid state battery includes a battery element, a positive electrode side/negative electrode side external terminal, and a protective layer. The battery element includes, along a stacking direction, one or more battery constituent units including a positive electrode layer and a negative electrode layer facing each other, and a solid electrolyte layer interposed between the positive electrode layer and the negative electrode layer. The positive electrode side external terminal is joined to an extended portion of the positive electrode layer, and the negative electrode side external terminal is joined to an extended portion of the negative electrode layer. That is, the external terminal is joined to the extended portion of each electrode layer. The protective layer is a layer that covers a surface of the battery element so that each extended portion and each external terminal can be joined to each other.

Here, the inventor of the present application has newly found that the conventional solid state battery has the following technical problems. Specifically, in the conventional solid state battery, glass or glass ceramics may be contained in the external terminal from the viewpoint of joining the external terminal and a battery element end surface including the extended portion of the electrode layer. However, in this case, a joint portion with the battery element end surface is limited to a portion where glass or glass ceramics included in the external terminal is exposed to the battery element end surface side. Thus, joint strength between the external terminal and the battery element may not be sufficient.

If an amount of glass or glass ceramics contained in the external terminal is relatively large, a large amount of glass or glass ceramics may be exposed on a connection surface side of the external terminal to a circuit board or the like, so that non-plating on a surface of the external terminal, solder wetting failure, and the like occur, and the external terminal cannot be suitably mounted on the circuit board or the like, whereby the solid state battery and the circuit board or the like may not be suitably electrically connected through the external terminal.

The present invention has been made in view of the above circumstances. That is, a main object of the present invention is to provide a solid state battery capable of achieving both improvement in joint strength between an external terminal and a battery element and suitable electrical connection between the external terminal and a circuit board or the like.

To achieve the above object, an embodiment of the present invention provides a solid state battery including: a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer; a first external terminal electrically connected to the positive electrode extended portion of the positive electrode layer; a second external terminal electrically connected to the negative electrode extended portion of the negative electrode layer; a protective layer covering a surface of the battery element; and a buffer portion surrounding at least one of the positive electrode layer and the negative electrode layer in a plan view of the solid state battery, wherein at least a local portion of the buffer portion includes a resin-free insulating material substantially identical to a resin-free insulating material of the protective layer, the location portion being (1) between a side surface of the positive electrode layer having the positive electrode extended portion and the first external terminal or (2) between a side surface of the negative electrode layer having the negative electrode extended portion and the second external terminal.

According to the solid state battery according to one embodiment of the present invention, it is possible to achieve both improvement in joint strength between an external terminal and a battery element and suitable electrical connection between the external terminal and a circuit board or the like.

DETAILED DESCRIPTION OF THE INVENTION

Hereinafter, the "solid state battery" of the present invention will be described in detail. Although description will be made with reference to the drawings as necessary, illustrated contents are schematically and exemplarily shown wherein their appearances, their dimensional proportions and the like are not necessarily real ones, and are merely for the purpose of making it easy to understand the present invention.

The term "solid state battery" used in the present invention refers to, in a broad sense, a battery whose constituent elements are composed of solid and refers to, in a narrow sense, all solid state battery whose battery constituent elements (particularly preferably all battery constituent elements) are composed of solid. In a preferred embodiment, the solid state battery in the present invention is a stacked solid state battery configured such that layers constituting a battery constituent unit are stacked with each other, and preferably such layers are composed of a sintered body. The "solid state battery" includes not only a so-called "secondary battery" capable of repeating charging and discharging, but also a "primary battery" capable of only discharging. According to a preferred embodiment of the present invention, the "solid battery" is a secondary battery. The "secondary battery" is not excessively limited by its name, and can include, for example, an electric storage device.

The term "planar view" or "plan view" used herein is based on a form where an object is viewed from above or below along a thickness direction based on a stacking direction of layers constituting the solid state battery. The term "sectional view" used here is based on a form when viewed from a direction substantially perpendicular to the thickness direction based on the stacking direction of layers constituting the solid state battery (to put it briefly, a form when taken along a plane parallel to the thickness direction). The terms "vertical direction" and "horizontal direction" directly or indirectly used here correspond respectively to the vertical direction and the horizontal direction in the drawing. Unless otherwise stated, the same numerals and symbols denote the same members or portions or the same contents. In a preferred aspect, it can be grasped that a vertical downward direction (that is, a direction in which gravity acts) corresponds to a "downward direction", and the opposite direction corresponds to an "upward direction".

Unless otherwise described, various numerical ranges mentioned herein are intended to include the very numerical values of the lower and upper limits. Specifically, for example, taking a numerical range "1 to 10" as an example, unless otherwise described, it is interpreted that the numerical range includes the lower limit "1" and also includes the upper limit "10".

[Configuration of Solid State Battery]

The solid state battery includes at least positive and negative electrode layers and a solid electrolyte. Specifically, the solid state battery includes a battery element that includes a battery constituent unit including a positive electrode layer, a negative electrode layer, and a solid electrolyte interposed between the positive electrode layer and the negative electrode layer.

In the solid state battery, each layer constituting the solid state battery may be formed by firing, and the positive electrode layer, the negative electrode layer, the solid electrolyte layer, and the like form a sintered layer. Preferably, the positive electrode layer, the negative electrode layer, and the solid electrolyte are fired integrally with each other, and therefore the battery element forms an integrally sintered body.

The positive electrode layer is an electrode layer containing at least a positive electrode active material. The positive electrode layer may further contain a solid electrolyte. For example, the positive electrode layer includes a sintered body containing at least positive electrode active material grains and solid electrolyte grains. In one preferred aspect, the positive electrode layer includes a sintered body containing substantially only positive electrode active material grains and solid electrolyte grains. On the other hand, the negative electrode layer is an electrode layer containing at least a negative electrode active material. The negative electrode layer may further contain a solid electrolyte. For example, the negative electrode layer includes a sintered body containing at least negative electrode active material grains and solid electrolyte grains. In one preferred aspect, the negative electrode layer includes a sintered body containing substantially only negative electrode active material grains and solid electrolyte grains.

The positive electrode active material and the negative electrode active material are substances involved in transfer of electrons in the solid state battery. Ions move (are conducted) between the positive electrode layer and the negative electrode layer with the solid electrolyte therebetween to transfer electrons, so that the solid state battery is charged and discharged. The positive electrode layer and the negative electrode layer are particularly preferably layers that occlude and release lithium ions. That is, the solid state battery is preferably an all-solid-state secondary battery in which lithium ions move between the positive electrode layer and the negative electrode layer with the solid electrolyte interposed between the layers, thereby charging and discharging the battery.

(Positive Electrode Active Material)

Examples of the positive electrode active material contained in the positive electrode layer include at least one selected from the group consisting of a lithium-containing phosphate compound having a nasicon-type structure, a lithium-containing phosphate compound having an olivine-type structure, a lithium-containing layered oxide, and a lithium-containing oxide having a spinel-type structure. As an example of the lithium-containing phosphate compound having a nasicon-type structure, $Li_3V_2(PO_4)_3$ can be mentioned. As an example of the lithium-containing phosphate compound having an olivine-type structure, $LiFePO_4$, $LiMnPO_4$, and the like can be mentioned. As an example of the lithium-containing layered oxide, $LiCoO_2$, $LiCo_{1/3}Ni_{1/3}Mn_{1/3}O_2$, and the like can be mentioned. As an example of the lithium-containing oxide having a spinel-type structure, $LiMn_2O_4$, $LiNi_{0.5}Mn_{1.5}O_4$, and the like can be mentioned.

(Negative Electrode Active Material)

Examples of the negative electrode active material contained in the negative electrode layer include at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a nasicon-type structure, a lithium-containing phosphate compound having an olivine-type structure, and a lithium-containing oxide having a spinel-type structure. As an example of the lithium alloy, Li—Al alloys and the like can be mentioned. As an example of the lithium-containing phosphate compound having a nasicon-type structure, $Li_3V_2$ (PO$_4$)$_3$, LiTi$_2$(PO$_4$)$_3$, and the like can be mentioned. As an example of the lithium-containing phosphate compound having an olivine-type structure, LiCuPO$_4$ and the like can be mentioned. As an example of the lithium-containing oxide having a spinel-type structure, Li$_4$Ti$_5$O$_{12}$ and the like can be mentioned.

In the solid state battery of the present invention in one preferred aspect, the positive electrode layer and the negative electrode layer are made of the same material.

The positive electrode layer and/or the negative electrode layer may contain a conductive aid. The conductive aid contained in the positive electrode layer and the negative electrode layer may be at least one agent that contains a metal material such as silver, palladium, gold, platinum, aluminum, copper, or nickel, carbon, and the like.

In addition, the positive electrode layer and/or the negative electrode layer may contain a sintering aid. Examples of the sintering aid include at least one selected from the group consisting of lithium oxide, sodium oxide, potassium oxide, boron oxide, silicon oxide, bismuth oxide, and phosphorus oxide.

(Solid Electrolyte)

The solid electrolyte is a material capable of conducting lithium ions. In particular, the solid electrolyte constituting the battery constituent unit in the solid state battery forms a layer through which lithium ions can conduct between the positive electrode layer and the negative electrode layer. The solid electrolyte may be provided at least between the positive electrode layer and the negative electrode layer. That is, the solid electrolyte may exist around the positive electrode layer and/or the negative electrode layer so as to protrude from between the positive electrode layer and the negative electrode layer. Specific examples of the solid electrolyte include a lithium-containing phosphate compound having a nasicon structure, an oxide having a perovskite structure, and an oxide having a garnet-type structure or a structure similar to the garnet-type structure. Examples of the lithium-containing phosphate acid compound having a nasicon structure include Li$_x$M$_y$(PO$_4$)$_3$ (1≤x≤2, 1≤y≤2, M is at least one selected from the group consisting of Ti, Ge, Al, Ga and Zr). As an example of the lithium-containing phosphate compound having a nasicon structure, Li$_{1.2}$Al$_{0.2}$Ti$_{1.8}$(PO$_4$)$_3$ and the like can be mentioned, for example. As an example of the oxide having a perovskite structure, La$_{0.55}$Li$_{0.35}$TiO$_3$ and the like can be mentioned. As an example of the oxide having a garnet-type structure or a structure similar to the garnet-type structure, Li$_7$La$_3$Zr$_2$O$_{12}$ and the like can be mentioned.

The solid electrolyte may contain a sintering aid. The sintering aid contained in the solid electrolyte may be selected from, for example, a material similar to the sintering aid that can be contained in the positive electrode layer/the negative electrode layer (Terminal)

Solid state batteries are generally provided with terminals (for example, external terminals). Terminals are provided, in particular, on the side surfaces of solid state batteries. Specifically, a terminal on the positive electrode side connected to the positive electrode layer and a terminal on the negative electrode side connected to the negative electrode layer are provided on the side surfaces of the solid state battery. The terminal of the positive electrode layer is joined to an end portion of the positive electrode layer, specifically, an extended portion formed at the end portion of the positive electrode layer. The terminal of the negative electrode layer is joined to an end portion of the negative electrode layer, specifically, an extended portion formed at the end portion of the negative electrode layer. In one preferred aspect, the terminal preferably contains glass or glass ceramics from the viewpoint of being joined to the battery element including the extended portion of the electrode layer. Furthermore, the terminal preferably contains a material having high conductivity. Although not particularly limited, specific examples of the material of the terminal include at least one selected from the group consisting of silver, gold, platinum, aluminum, copper, tin, and nickel.

(Protective Layer)

A protective layer can be generally formed on an outermost side of the solid state battery, and used to electrically, physically, and/or chemically protect. As a material forming the protective layer, preferred is a material that is excellent in insulation property, durability and/or moisture resistance, and is environmentally safe.

The protective layer is a layer that covers a surface of the battery element so that the extended portion of each electrode layer and each external terminal can be joined to each other. Specifically, the protective layer covers the surface of the battery element so that the extended portion of the positive electrode layer and the external terminal on the positive electrode side can be joined, and covers the surface of the battery element so that the extended portion of the negative electrode layer and the external terminal on the negative electrode side can be joined. That is, the protective layer does not cover the entire surface of the battery element without a gap, but covers the battery element so that the extended portion of the electrode layer (end portion of the electrode layer) is exposed in order to join the extended portion of the electrode layer of the battery element and the external terminal.

[Features of the Present Invention]

Hereinafter, features of the present invention will be described. The features of the present invention are based on the premise that an outline of each of the positive electrode layer and the negative electrode layer is located inside an outline of the solid electrolyte layer in plan view.

The inventor of the present application intensively studied to find a solution for a technical problem of a conventional solid state battery (that is, it is difficult to achieve both improvement in joint strength between the external terminal and the battery element and suitable electrical connection between the external terminal and the circuit board or the like). As a result, the inventor of the present application has devised a solid state battery according to one embodiment of the present invention having the following features (see FIG. 1).

As will be described in detail below, a solid state battery 500 according to one embodiment of the present invention is characterized in that a buffer portion 30 which is the constituent element thereof has a unique configuration as compared with a conventional solid state battery.

In the solid state battery 500 according to one embodiment of the present invention, a battery element 100 which is the constituent element thereof includes the buffer portion 30 provided so as to surround at least one electrode layer 10 of a positive electrode layer 10A and a negative electrode layer 10B.

One side of the buffer portion 30 is configured to be in contact with a side surface of the electrode layer 10 in plan view. In addition, the other side of the buffer portion 30 is configured to be in contact with an external terminal 200 on one electrode side, a protective layer 300, and the external terminal 200 on a counter electrode side in plan view. The external terminal 200 is joined to the extended portions of the respective electrode layers 10 of the positive electrode layer 10A and the negative electrode layer 10B. Specifically, an external terminal 200A on the positive electrode side is configured to be capable of being joined to the extended portion of the positive electrode layer 10A. An external terminal 200B on the negative electrode side is configured to be capable of being joined to the extended portion of the negative electrode layer 10B.

Figure 3:
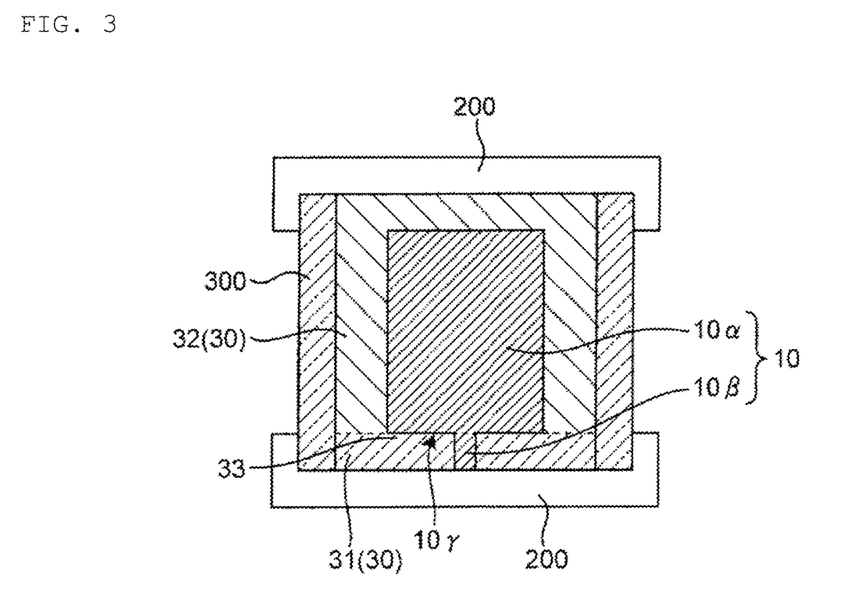
FIG. 3 is a plan view schematically showing an aspect in which some buffer portions surrounding the electrode layer include the resin-free insulating material.
Figure 4:
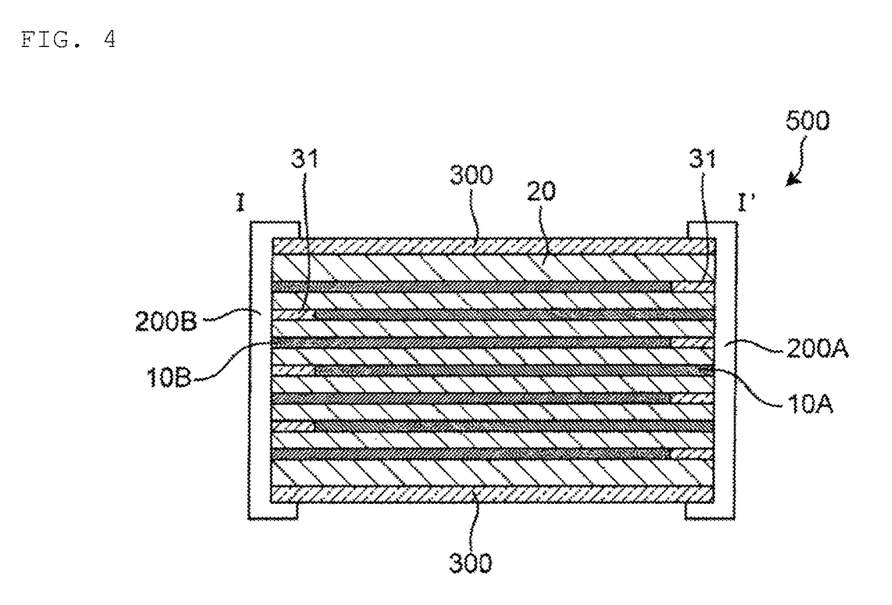
FIG. 4 is a sectional view schematically showing the solid state battery according to one embodiment of the present invention between line I-I' in FIG. 1.
Figure 5:
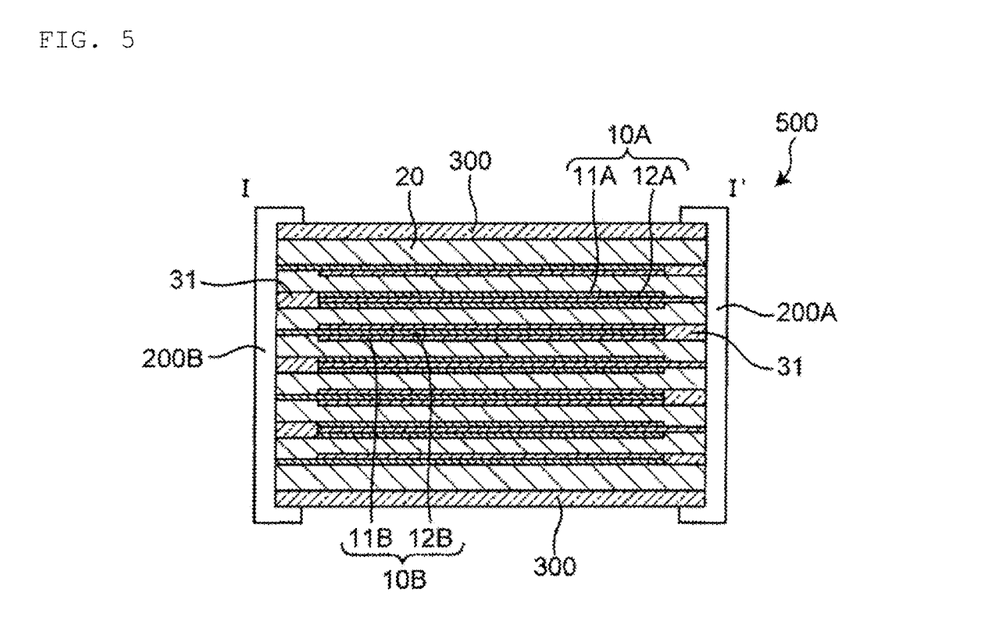
FIG. 5 is a sectional view schematically showing the solid state battery according to one embodiment of the present invention between line I-I' in FIG. 1 (a schematic sectional view specifically showing FIG. 4).
Figure 6:
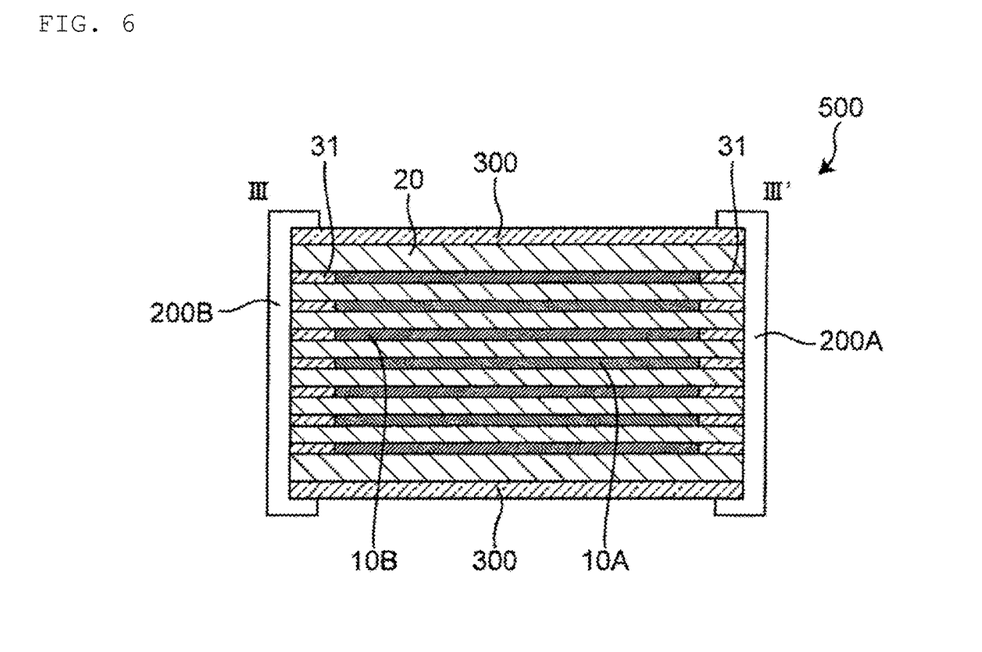
FIG. 6 is a sectional view schematically showing the solid state battery according to one embodiment of the present invention between line III-III' in FIG. 1.

In such a configuration, in one embodiment of the present invention, in the buffer portion 30, at least a local portion 33 between a side surface of the electrode layer 10 on which the extended portion is formed and the external terminal 200 includes a resin-free insulating material substantially identical to that of the protective layer 300 in plan view. This configuration is a main feature of the present invention (see FIG. 3). The term "resin-free insulating material" used here is an insulating material that does not contain a resin and refers to an insulating inorganic material that does not have ion conductivity and electron conductivity. The expression "at least the local portion 33 includes the resin-free insulating material substantially identical to that of the protective layer 300" used here refers to that at least the local portion 33 and the composition of the resin-free insulating material of the protective layer 300 are absolutely the same or substantially the same.

In the conventional solid state battery, a joint point between an electrode layer and an external terminal in plan view is limited to a local region between an extended portion of the electrode layer and the external terminal. On the other hand, in one embodiment of the present invention, at least the local portion 33 of the buffer portion 30 between the side surface of the electrode layer 10 on which the extended portion is formed and the external terminal 200 is a portion 31 including the resin-free insulating material substantially identical to that of the protective layer 300.

The local portion 33 of the buffer portion 30 has viscosity at a high temperature because it includes a resin-free insulating material. Thus, due to the viscosity of the local portion 33, in plan view, one side of the local portion 33 of the buffer portion 30 can be joined to the external terminal 200 at the time of firing, and the other side thereof can be joined to the side surface of the electrode layer 10 on which the extended portion is formed. That is, the local portion 33 of the buffer portion 30 can be joined to the side surface of the electrode layer 10 on which the extended portion is formed and the external terminal 200, respectively.

As an example, a configuration in which the electrode layer 10 includes a main portion 10α and an extended portion 10β continuous to the main portion 10α is taken as an example. The extended portion 10β of the electrode layer 10 may be tapered toward its tip at the end portion of the electrode layer 10 without adopting an aspect in which in the main portion 10α of the electrode layer 10, the extended portion 10β is formed in part on a side surface 10y on which the extended portion is formed. More specifically, the extended portion 10β of the electrode layer 10 may be tapered toward its tip at the end portion of the electrode layer 10 without the following side surface 10γ on which the extended portion is formed in the main portion 10α of the electrode layer 10.

In this case, at least the local portion 33 of the buffer portion 30 between the side surface 10y and the external terminal 200 is the portion 31 including the resin-free insulating material substantially identical to that of the protective layer 300. See FIG. 3.

As described above, the local portion 33 of the buffer portion 30 may have viscosity at a high temperature because it includes a resin-free insulating material. Thus, in plan view, one side of the local portion 33 of the buffer portion 30 can be joined to the external terminal 200 at the time of firing, and the other side thereof can be joined to the main portion 10α of the electrode layer 10. That is, the local portion 33 of the buffer portion 30 can be joined to the side surface 10y and the external terminal 200, respectively.

As a result, as compared with the conventional solid state battery, the electrode layer 10 and the external terminal 200 can be firmly joined to each other with the local portion 33 of the buffer portion 30 therebetween. As a result, as compared with the conventional solid state battery, the material contributing to a joint at the terminal/a battery interface portion is increased, so that the joint strength between the battery element 100 including the buffer portion 30 and the electrode layer 10 and the external terminal 200 can be improved as a whole. Consequently, electrical connection can also be suitably maintained between the electrode layer 10 and the external terminal 200.

In the conventional solid state battery, only the external terminal contains the resin-free insulating material such as glass or glass ceramics from the viewpoint of joining the external terminal and the battery element including the extended portion of the electrode layer. However, in this case, a large amount of glass or glass ceramics may be exposed on the connection surface side of the external terminal to the circuit board or the like, so that the external terminal cannot be suitably mounted on the circuit board or the like, whereby the solid state battery and the circuit board or the like may not be suitably electrically connected.

In this regard, in one embodiment of the present invention, instead of containing the resin-free insulating material such as glass or glass ceramics only in the external terminal, at least a predetermined portion (specifically, the local portion 33 of the buffer portion 30 between the side surface of the electrode layer 10 on which the extended portion is formed and the external terminal 200) of at least the buffer portion 30 is formed from the resin-free insulating material.

Thus, a content ratio of the resin-free insulating material such as glass or glass ceramics in the external terminal 200 can be reduced. By reducing the content ratio of the resin-free insulating material in the external terminal 200, it is possible to suppress exposure of the resin-free insulating material on the connection surface side of the external terminal 200 to the circuit board or the like. This makes it possible to suppress the occurrence of non-plating on the external terminal 200, solder wetting failure, and the like. As a result, the external terminal 200 can be suitably mounted on the circuit board or the like, and the external terminal 200 and the circuit board or the like can be suitably electrically connected. Thus, the solid state battery 500 according to one embodiment of the present invention can be suitably electrically connected to the circuit board or the like.

From the above, according to one embodiment of the present invention, it is possible to achieve both improvement in joint strength between the external terminal 200 and the battery element 100 including the buffer portion 30 and the electrode layer 10 and suitable electrical connection between the external terminal 200 and the circuit board or the like. As a result, the solid state battery 500 according to one embodiment of the present invention can be suitably used as a power source of an electronic device.

The solid state battery 500 according to one embodiment of the present invention preferably adopts the following aspect.

Figure 2:
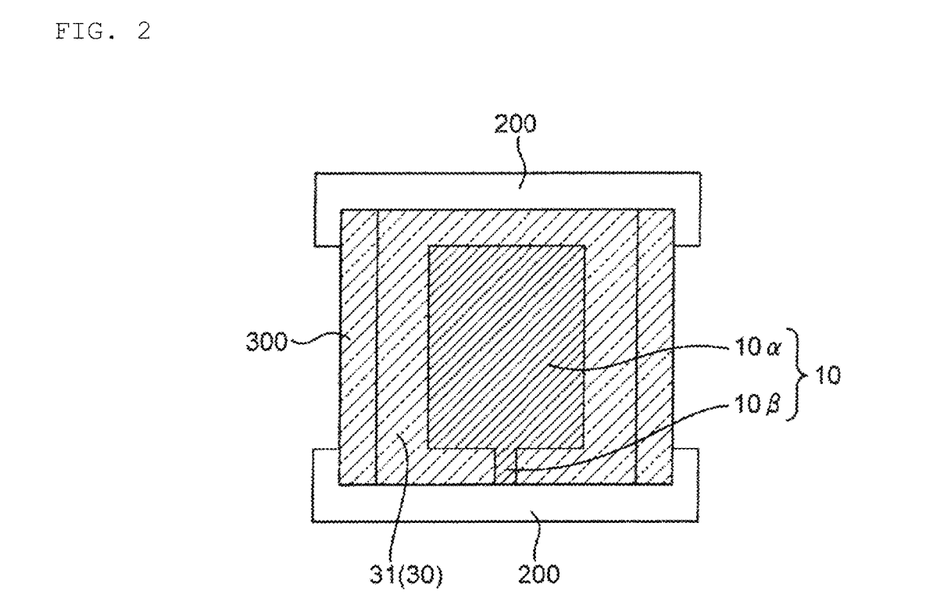
FIG. 2 is a plan view schematically showing an aspect in which all buffer portions surrounding an electrode layer include a resin-free insulating material.
Figure 7:
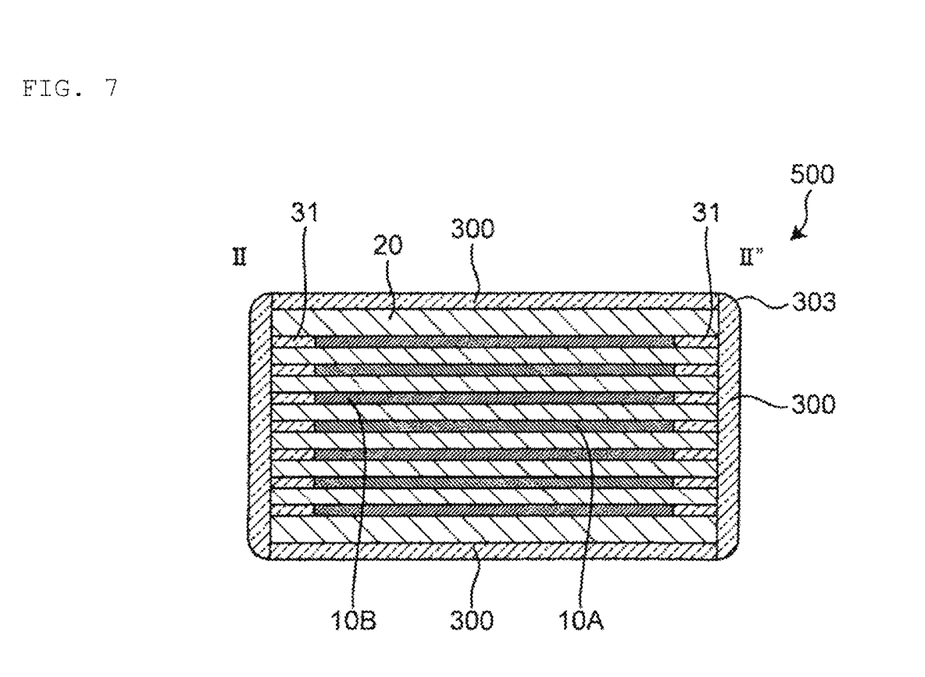
FIG. 7 is a sectional view schematically showing the solid state battery according to one embodiment of the present invention between line II-II' in FIG. 1.

In one aspect, in plan view, not only the buffer portion located between the external terminal 200 and the electrode layer 10 but also the buffer portion 30 located between the protective layer 300 and the electrode layer 10 is preferably the portion including the resin-free insulating material (see FIGS. 2 and 7).

According to such a configuration, in plan view, both the buffer portion 30 located between the protective layer 300 and the electrode layer 10 and the protective layer 300 in contact with the buffer portion 30 include the resin-free insulating material. That is, both the protective layer 300 and the buffer portion 30 located between the protective layer 300 and the electrode layer 10 and in contact with the protective layer 300 include the resin-free insulating material.

As described above, the resin-free insulating material refers to an insulating inorganic material having no ion conductivity and no electron conductivity, and the inorganic material having no ion conductivity refers to an inorganic material having an ion conductivity of $1 \times 10^{-7}$ S/cm or less. From the viewpoint of suppressing deterioration of the battery for a longer period of time, the ion conductivity is preferably $1 \times 10^{-12}$ S/cm or less. The ion conductivity of the inorganic material having no ion conductivity is usually $1 \times 10^{-18}$ S/cm or more. The inorganic material having no electron conductivity refers to an inorganic material having an electron conductivity of $1 \times 10^{-7}$ S/cm or less. From the viewpoint of suppressing deterioration of the battery for a longer period of time, the electron conductivity is preferably $1 \times 10^{-12}$ S/cm or less. The electron conductivity of the inorganic material having no electron conductivity is usually $1 \times 10^{-18}$ S/cm or more.

Examples of the insulating material other than the resin include an insulating material containing glass and ceramics. Examples of the glass include quartz glass ($SiO_2$) and composite oxide-based glass obtained by combining $SiO_2$ and at least one selected from the group consisting of $B_2O_3$, PbO, MgO, ZnO, $Bi_2O_3$, $Na_2O$, and $Al_2O_3$. Examples of the ceramics include at least one selected from the group consisting of $Al_2O_3$ (alumina), $ZnAl_2O_4$ (garnite), and $Mg_2SiO_4$ (forsterite). The protective layer 300 and the buffer portion 30 located between the protective layer 300 and the electrode layer 10 may contain a material having electron conductivity (for example, metal) as long as the battery element 100 is not short-circuited. When the protective layer 300 and the buffer portion 30 located between the protective layer 300 and the electrode layer 10 contain the material having electron conductivity, a content ratio of an electron conductive material may be, for example, 1 vol % or less. When the protective layer 300 and the buffer portion 30 located between the protective layer 300 and the electrode layer 10 contain the electron conductive material (for example, metal), heat generated by a battery reaction can be smoothly released to the outside.

The protective layer 300 and the buffer portion 30 located between the protective layer 300 and the electrode layer 10 include a sintered body containing insulating substance particles other than the resin described above. The sintered body constituting the protective layer 300 and the buffer portion 30 located between the protective layer 300 and the electrode layer 10 has a pore between the insulating substance particles, but has such compactness that adsorption, absorption, and permeation of moisture and gas (carbon dioxide) can be suppressed in the thickness direction (for example, the stacking direction).

A porosity of the protective layer 300 and the buffer portion 30 located between the protective layer 300 and the electrode layer 10 may be, for example, 0.1 vol % to 20 vol %, and particularly 1 vol % to 10% vol. As the porosity, a value measured by a weight porosity method, a computed tomography method using CT scanning, an immersion method, or the like is used.

Oxygen permeability in the thickness direction of the protective layer 300 and the buffer portion 30 located between the protective layer 300 and the electrode layer 10 may be, for example, $10^{-1}$ cc/m$^2$/day/atmospheric pressure or less, particularly, $10^{-3}$ cc/m$^2$/day/atmospheric pressure or less.

$H_2O$ permeability in the thickness direction of the protective layer 300 and the buffer portion 30 located between the protective layer 300 and the electrode layer 10 may be, for example, $10^{-2}$ g/m$^2$/day or less, particularly, $10^{-4}$ g/m$^2$/day or less. As the $H_2O$ permeability, a value measured at 25° C. by a carrier gas method, a crimping method, or a Ca corrosion method is used.

Here, in the conventional aspect, the protective layer 300 may include the resin-free insulating material. In this case, as compared with the protective layer containing a resin (for example, a polymer compound), the protective layer 300 including the resin-free insulating material hardly adsorbs, absorbs, and permeates moisture and gas (carbon dioxide). As a result, in the protective layer 300, as compared with the protective layer containing a polymer compound, cracking and falling due to expansion by adsorption and absorption of moisture and gas (carbon dioxide) hardly occur, and falling due to vibration, impact, or the like hardly occurs. That is, the protective layer 300 can function as a "water vapor transmission preventing layer" for preventing the electrode of the battery element inside the solid state battery from being damaged.

In this regard, in the present aspect, not only the protective layer 300 but also the buffer portion 30 located between the protective layer 300 and the electrode layer 10 and in contact with the protective layer 300 includes such a resin-free insulating material. Thus, as compared with the case where only the protective layer 300 includes the resin-free insulating material, the thickness of the portion including the resin-free insulating material can be further increased. As a result, it is possible to more suitably suppress damage of the electrode 10 of the battery element in the solid state battery.

In one aspect, the buffer portion 30 located between the electrode layer 10 and the external terminal 200 on the counter electrode side with respect to the external terminal 200 in contact with the extended portion 10β of the electrode layer 10 in plan view preferably includes the resin-free insulating material (see FIGS. 2 and 4 to 6).

The feature of the present invention is that, from the viewpoint of improving the joint strength between the battery element 100 and the external terminal 200, at least the local portion of the buffer portion 30 between the side surface of the electrode layer 10 on which the extended portion is formed and the external terminal 200 includes the resin-free insulating material substantially identical to that of the protective layer 300. In this regard, for example, as shown in FIG. 2 (plan view), the buffer portion 30 located between the electrode layer 10 and the external terminal 200 (for example, the external terminal 200A on the positive electrode side) on the counter electrode side with respect to the external terminal 200 (for example, the external terminal 200B on the negative electrode side) in contact with the extended portion 10β of the electrode layer 10 also preferably includes the resin-free insulating material.

According to such a configuration, since the resin-free insulating material can have viscosity at high temperature, the buffer portion 30 located between the electrode layer 10 and the external terminal 200 on the counter electrode side with respect to the external terminal 200 in contact with the extended portion 10β of the electrode layer 10 is configured such that one side is joined to the side surface of the electrode layer 10 and the other side is joined to the external terminal 200. As a result, since a joint region is further increased as compared with the aspect shown in FIG. 3 (basic aspect of the present invention), the joint strength between the electrode layer 10 and the two external terminals 200 (the external terminal 200A on the positive electrode side, the external terminal 200B on the negative electrode side) facing each other can be further improved as a whole.

More preferably, the above preferred embodiments 1 and 2 of the present invention are preferably combined. That is, it is more preferable that the whole of the buffer portion 30 surrounding the electrode layer 10 in a single form includes the resin-free insulating material in plan view (see FIGS. 2 and 4 to 7).

According to such a combination aspect, not only the protective layer 300 but also the buffer portion 30 located between the protective layer 300 and the electrode layer 10 and in contact with the protective layer 300 includes the resin-free insulating material. Thus, as compared with the case where only the protective layer 300 includes the resin-free insulating material, the thickness of a portion formed from a resin-free insulating material having a water vapor transmission preventing function can be further increased. As a result, it is possible to more suitably suppress damage of the electrode 10 of the battery element in the solid state battery.

In addition, since the whole of the buffer portion 30 surrounding the electrode layer 10 in a single form includes the resin-free insulating material, one side of the buffer portion 30 can be joined to each side surface of the electrode layer 10, and the other side thereof can be joined to the external terminal 200 (200 A, 200 B) facing the protective layers 300 facing each other. As a result, since the joint region is further increased as compared with the conventional solid state battery, the joint strength between the electrode layer 10 and the external terminal 200 can be further improved as a whole. As a result, electrical connection can be more suitably performed between the electrode layer 10 and the external terminal 200, and as a result, the solid state battery 500 according to one embodiment of the present invention can be more suitably used as a power source of an electronic device.

Figure 1:
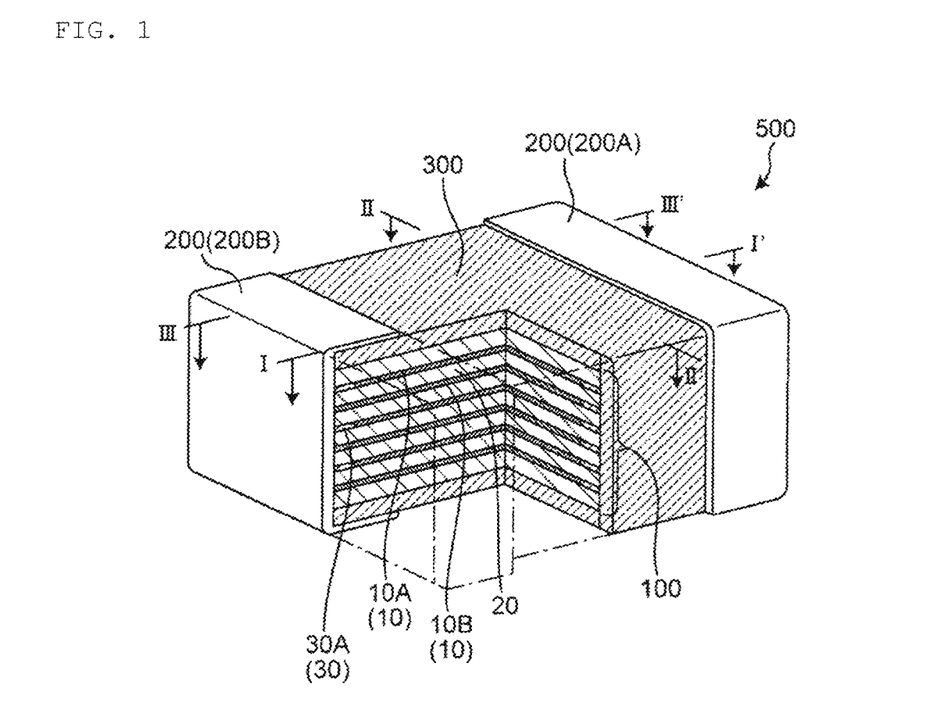
FIG. 1 is a perspective view schematically showing a solid state battery showing a partial internal structure according to one embodiment of the present invention.

In one aspect, it is preferable that a corner portion 303 of the protective layer 300 has a curved shape in sectional view (see FIGS. 1 and 7).

In a manufacturing process of the solid state battery described later, the obtained solid state batteries may rub against each other or collide with each other, and as a result, chipping and/or cracking may occur in a corner portion of the protective layer of the solid state battery in sectional view. In order to solve such a problem, it is conceivable to make the corner portion 303 of the protective layer 300 curved (that is, R shape). This makes it possible to suitably avoid the occurrence of chipping and/or cracking in the corner portion 303 of the protective layer 300.

[Method of Manufacturing Solid State Battery]

Hereinafter, a method of manufacturing a solid state battery according to one embodiment of the present invention will be described (see FIG. 8(a)-FIG. 8(d)). In such a manufacturing method, the solid state battery can be manufactured by a printing method such as a screen printing method, a green sheet method using a green sheet, or a method combining these methods.

(Step of Forming Unfired Body)

First, a solid electrolyte layer paste is formed by mixing the solid electrolyte material, the sintering aid, the organic material, the solvent, and the like. The resin-free insulating material, the organic material, the solvent, and the like are mixed to form a protective layer paste.

A solid electrolyte layer sheet 20' and a protective layer sheet 301' are formed from the solid electrolyte layer paste and the protective layer paste, respectively, by sheet forming.

The positive electrode active material, the solid electrolyte, the conductive aid, the organic binder, the solvent, and any additive are mixed to form a positive electrode paste. Similarly, the negative electrode active material, the solid electrolyte, the conductive aid, the organic binder, the solvent, and any additive are mixed to form a negative electrode paste.

The organic material contained in the paste is not particularly limited, and a polymer compound such as a polyvinyl acetal resin, a cellulose resin, a polyacrylic resin, a polyurethane resin, a polyvinyl acetate resin, or a polyvinyl alcohol resin can be used. The solvent is not particularly limited as long as the organic material can be dissolved, and for example, toluene, ethanol and the like can be used.

For example, the positive electrode paste 10A' is printed on the solid electrolyte layer sheet 20', and a current collecting layer is printed as necessary. Similarly, for example, the negative electrode paste 10B' is printed on the solid electrolyte layer sheet 20', and a current collecting layer is printed as necessary.

Figure 8A:
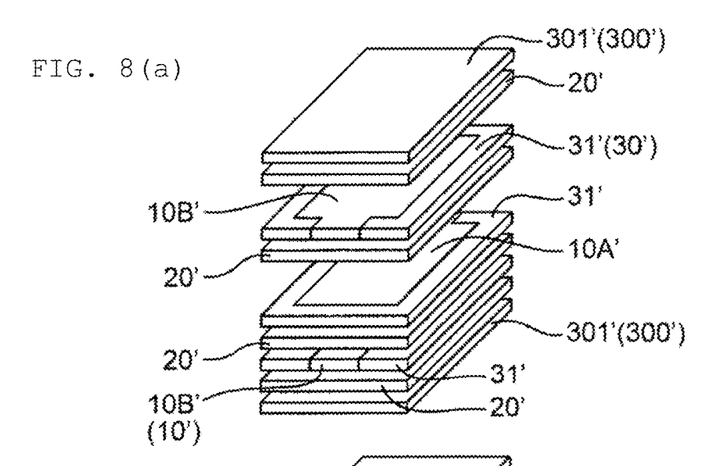
FIG. 8(a) to FIG. 8(d) is a schematic view showing a manufacturing flow of the solid state battery according to one embodiment of the present invention.

A buffer portion paste 30' is printed on the solid electrolyte layer sheet 20' so as to surround each of the electrode pastes 10' (see FIG. 8(a)).

In particular, in one embodiment of the present invention, as the buffer portion paste 30', in at least the electrode paste 10', on a portion that is located between a portion serving as the side surface of the electrode layer on which the extended portion is formed and the external terminal and serves as the local portion, a paste 31' obtained by mixing the resin-free insulating material, the organic material, the solvent, and the like is printed.

Preferably, the paste 31' obtained by mixing the resin-free insulating material, the organic material, the solvent, and the like is printed so as to surround the whole of the outline of each of the electrode pastes 10'.

Next, the protective layer sheet 301', the negative electrode paste 10B' and the buffer portion paste 30' printed on the solid electrolyte sheet 20', the positive electrode paste 10A' and the buffer portion paste 30' printed on the solid electrolyte sheet 20', the negative electrode paste 10B' and the buffer portion paste 30' printed on the solid electrolyte sheet 20', the solid electrolyte layer sheet 20', and the protective layer sheet 301' are stacked in this order from the bottom along the stacking direction.

Figures 8B, 8C:
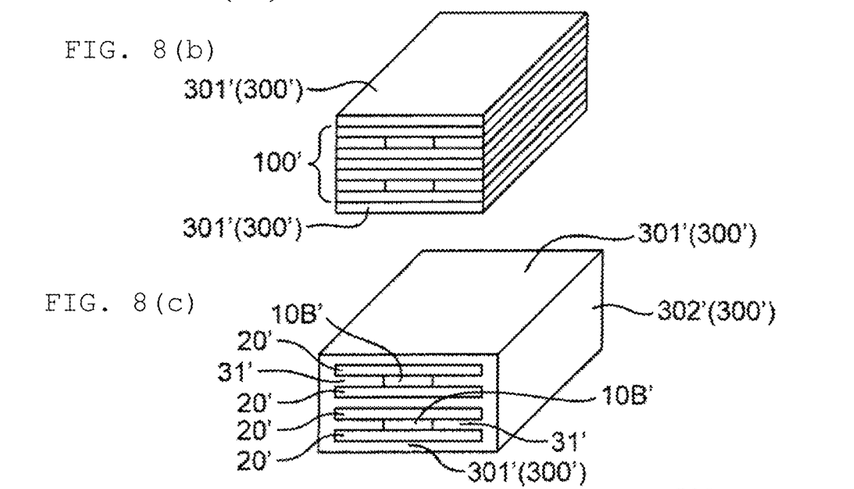
Figure 8D:
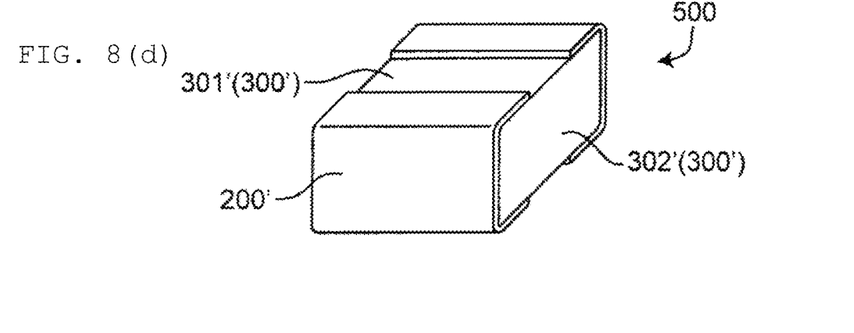

Thus, an unfired laminate is formed (see FIG. 8(b)). After the unfired laminate is formed, a protective layer sheet 302' is provided on a side surface of the unfired laminate so that an end portion of a portion serving as the electrode layer to be joined to the external terminal is exposed (see FIG. 8(c)).

(Firing Step)

Next, the obtained unfired body is subjected to firing. Firing is carried out by removing the organic material in a nitrogen gas atmosphere containing oxygen gas, for example, at 500° C., and then heating in the nitrogen gas atmosphere, for example, at 550° C. to 1000° C. Firing is usually carried out while pressurizing the unfired body in the stacking direction (in some cases, stacking direction and direction perpendicular to the stacking direction). A pressurizing force is not particularly limited, and may be, for example, 1 kg/cm² to 1000 kg/cm², particularly 5 kg/cm² to 500 kg/cm².

Finally, the external terminal 300 is subjected to a baking treatment so as to be joined to the end portion of the electrode layer exposed after firing. The external terminals on the positive electrode side and the negative electrode side are not limited to be formed after sintering of the laminate, and may be formed before firing and subjected to simultaneous sintering (see FIG. 8(d)).

The external terminal on the positive electrode side can be formed by applying a conductive paste to a side surface of a sintered laminate from which the positive electrode layer is exposed. Similarly, the external terminal on the negative electrode side can be formed by applying a conductive paste to a side surface of a sintered laminate from which the negative electrode is exposed. When the external terminals on the positive electrode side and the negative electrode side are provided so as to extend to a principal surface of the sintered laminate, the external terminals can be connected to a mounting land in a small area in the next step, which is preferable. The component of the external terminal may be selected from at least one selected from the group consisting of silver, gold, platinum, aluminum, copper, tin, and nickel.

As described above, the solid state battery 500 according to one embodiment of the present embodiment can be obtained. In the obtained solid state battery 500, in the buffer portion 30, at least the local portion 33 between the side surface of the electrode layer 10 on which the extended portion is formed and the external terminal 200 includes the resin-free insulating material substantially identical to that of the protective layer 300 (see FIG. 3).

The local portion 33 of the buffer portion 30 has viscosity at a high temperature because it includes a resin-free insulating material. Thus, when the external terminal is subjected to the baking treatment, since the local portion 33 of the buffer portion 30 has viscosity at a high temperature, one side of the local portion 33 of the buffer portion 30 can be joined to the external terminal 200 and the other side thereof can be joined to the side surface of the electrode layer 10 on which the extended portion is formed in plan view. That is, the local portion 33 of the buffer portion 30 can be joined to the "side surface of the electrode layer 10 on which the extended portion is formed" and the "external terminal 200", respectively.

As a result, as compared with the conventional solid state battery, the electrode layer 10 and the external terminal 200 can be firmly joined to each other with the local portion 33 of the buffer portion 30" therebetween. As a result, as compared with the conventional solid state battery, the material contributing to joint at the terminal/the battery interface portion is increased, so that the joint strength between the battery element 100 and the external terminal 200 can be improved as a whole.

In the obtained solid state battery 500 according to one embodiment, instead of containing the resin-free insulating material such as glass or glass ceramics only in the external terminal, at least a predetermined portion (specifically, the local portion 33 of the buffer portion 30 between the side surface of the electrode layer 10 on which the extended portion is formed and the external terminal 200) of at least the buffer portion 30, which is one of the constituent element of the battery element, includes the resin-free insulating material.

Thus, a content ratio of the resin-free insulating material such as glass or glass ceramics in the external terminal 200 can be reduced. By reducing the content ratio of the resin-free insulating material in the external terminal 200, it is possible to suppress exposure of the resin-free insulating material on the connection surface side of the external terminal 200 to the circuit board or the like. This makes it possible to suppress occurrence of non-plating on the external terminal 200, solder wetting failure, and the like, and as a result, the external terminal 200 can be suitably mounted on the circuit board or the like. As a result, the external terminal 200 and the circuit board or the like can be suitably electrically connected. Thus, the obtained solid state battery 500 according to one embodiment can be suitably electrically connected to the circuit board or the like.

From the above, the obtained solid state battery 500 according to one embodiment, it is possible to achieve both improvement in joint strength between the external terminal 200 and the battery element 100 including the buffer portion 30 and the electrode layer 10 and suitable electrical connection between the external terminal 200 and the circuit board or the like. As a result, the obtained solid state battery 500 can be suitably used as a power source of an electronic device.

Although the solid state battery according to one embodiment of the present invention has been described above, the present invention is not limited thereto, and it will be understood that various changes will be made by those skilled in the art without departing from the scope of the invention defined in the claims.

One embodiment of the present invention as described above includes the following preferable aspects.

First Aspect:

A solid state battery including: a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer; a first external terminal electrically connected to the positive electrode extended portion of the positive electrode layer; a second external terminal electrically connected to the negative electrode extended portion of the negative electrode layer; a protective layer covering a surface of the battery element; and a buffer portion surrounding at least one of the positive electrode layer and the negative electrode layer in a plan view of the solid state battery, wherein at least a local portion of the buffer portion includes a resin-free insulating material substantially identical to a resin-free insulating material of the protective layer, the location portion being (1) between a side surface of the positive electrode layer having the positive electrode extended portion and the first external terminal or (2) between a side surface of the negative electrode layer having the negative electrode extended portion and the second external terminal.

Second Aspect:

The solid state battery according to the first aspect, wherein in the plan view, a first side of the local portion of the buffer portion is joined to the first external terminal or the second external terminal, and a second side of the local portion of the buffer portion is joined to the side surface of the positive electrode layer having the positive electrode extended portion or the side surface of the negative electrode layer having the negative electrode extended portion.

Third Aspect:

The solid state battery according to the first aspect or the second aspect, wherein only the local portion includes the resin-free insulating material substantially identical to the resin-free insulating material of the protective layer.

Fourth Aspect:

The solid state battery according to any one of the first aspect to third aspect, wherein in the plan view, the buffer portion between the protective layer and the positive electrode layer or the negative electrode layer includes the resin-free insulating material.

Fifth Aspect:

The solid state battery according to the fourth aspect, in which in the plan view, both the buffer portion and the protective layer in contact with the buffer portion include the resin-free insulating material.

Sixth Aspect:

The solid state battery according to any one of the first aspect to fifth aspect, in which in the plan view, (1) the buffer portion located between the positive electrode layer and the second external terminal includes the resin-free insulating material or (2) the buffer portion located between the negative electrode layer and the first external terminal includes the resin-free insulating material.

Seventh Aspect:

The solid state battery according to any one of the first aspect to sixth aspect, in which in the plan view, a whole of the buffer portion includes the resin-free insulating material.

Eighth Aspect:

The solid state battery according to any one of the first aspect to seventh aspect, in which both the protective layer and a region of the buffer portion, which includes the resin-free insulating material, are structured to prevent water vapor transmission.

Ninth Aspect:

The solid state battery according to any one of the first aspect to eighth aspect, in which the resin-free insulating material contains glass and ceramics.

Tenth Aspect:

The solid state battery according to any one of the first aspect to ninth aspect, in which an outline of each of the positive electrode layer and the negative electrode layer is located inside an outline of the solid electrolyte layer in plan view.

Eleventh Aspect:

The solid state battery according to any one of the first aspect to tenth aspect, in which a corner portion of the protective layer is curved in a sectional view of the solid state battery.

Twelfth Aspect:

The solid state battery according to any one of the first aspect to eleventh aspect, in which the positive electrode layer and the negative electrode layer are layers that occlude and release lithium ions.

The solid state battery according to an embodiment of the present invention can be used in various fields in which electricity storage is assumed. Although the followings are merely examples, the solid state battery according to an embodiment of the present invention can be used in electricity, information and communication fields where mobile devices and the like are used (e.g., mobile device fields, such as mobile phones, smart phones, smart watches, laptop computers and digital cameras, activity meters, arm computers, and electronic papers), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), medical applications (medical equipment fields such as earphone hearing aids), pharmaceutical applications (the fields such as dose management systems), IoT fields, and space and deep sea applications (e.g., the fields such as spacecraft and research submarines).

DESCRIPTION OF REFERENCE SYMBOLS

500: Solid state battery
300: Protective layer
300', 301', 302': Protective layer sheet
303: Corner portion of protective layer
200: External terminal
200A: External terminal on positive electrode side
200B: External terminal on negative electrode side
100: Battery element
30, 30A: Buffer portion
30': Buffer portion paste
31: Portion formed from resin-free insulating material
31': Buffer portion paste containing resin-free insulating material
32: Portion formed from solid electrolyte
33: Local portion of buffer portion
20: Solid electrolyte layer
20': Solid electrolyte sheet
10: Electrode layer
10': Electrode layer paste
10A: Positive electrode layer
10A': Positive electrode layer paste
10B: Negative electrode layer
10B': Negative electrode layer paste
$10\alpha$: Main portion of electrode layer
$10\beta$: Extended portion of electrode layer
$10\gamma$: Side surface on which extended portion is formed in main portion of electrode layer
11A: Positive electrode material layer
11B: Positive electrode current collector layer
12A: Negative electrode material layer
12B: Negative electrode current collector layer

The invention claimed is:

1. A solid state battery comprising:
a battery element including, along a stacking direction, one or more battery constituent units including a positive electrode layer defining a side surface and having a positive electrode extended portion extending from a part of the side surface of the positive electrode layer, a negative electrode layer defining a side surface and having a negative electrode extended portion extending from a part of the side surface of the negative electrode layer, and a solid electrolyte layer interposed between the positive electrode layer and the negative electrode layer;
a first external terminal electrically connected to the positive electrode extended portion of the positive electrode layer;
a second external terminal electrically connected to the negative electrode extended portion of the negative electrode layer;
a protective layer covering a surface of the battery element; and a buffer portion surrounding at least one of the positive electrode layer and the negative electrode layer in a plan view of the solid state battery, wherein at least a local portion of the buffer portion includes a resin-free insulating material substantially identical to a resin-free insulating material of the protective layer, the local portion being (1) between the side surface of the positive electrode layer having the positive electrode extended portion and the first external terminal and in a same plane as the side surface and the positive electrode extended portion or (2) between the side surface of the negative electrode layer having the negative electrode extended portion and the second external terminal and in a same plane as the side surface and the negative electrode extended portion, the same plane being perpendicular to the stacking direction.

2. The solid state battery according to claim 1, wherein in the plan view, a first side of the local portion of the buffer portion is joined to the first external terminal or the second external terminal, and a second side of the local portion of the buffer portion is joined to the side surface of the positive electrode layer having the positive electrode extended portion or the side surface of the negative electrode layer having the negative electrode extended portion.

3. A solid state battery comprising:
a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer;
a first external terminal electrically connected to the positive electrode extended portion of the positive electrode layer;
a second external terminal electrically connected to the negative electrode extended portion of the negative electrode layer;
a protective layer covering a surface of the battery element; and
a buffer portion surrounding at least one of the positive electrode layer and the negative electrode layer in a plan view of the solid state battery, wherein at least a local portion of the buffer portion includes a resin-free insulating material substantially identical to a resin-free insulating material of the protective layer, the local portion being (1) between a side surface of the positive electrode layer having the positive electrode extended portion and the first external terminal or (2) between a side surface of the negative electrode layer having the negative electrode extended portion and the second external terminal,
wherein only the local portion includes the resin-free insulating material substantially identical to the resin-free insulating material of the protective layer.

4. The solid state battery according to claim 1, wherein in the plan view, the buffer portion between the protective layer and the positive electrode layer or the negative electrode layer includes the resin-free insulating material.

5. The solid state battery according to claim 4, wherein in the plan view, both the buffer portion and the protective layer in contact with the buffer portion include the resin-free insulating material.

6. The solid state battery according to claim 1, wherein in the plan view, (1) the buffer portion located between the positive electrode layer and the second external terminal includes the resin-free insulating material or (2) the buffer portion located between the negative electrode layer and the first external terminal includes the resin-free insulating material.

7. The solid state battery according to claim 1, wherein in the plan view, a whole of the buffer portion includes the resin-free insulating material.

8. The solid state battery according to claim 1, wherein both the protective layer and a region of the buffer portion, which include the resin-free insulating material, are structured to prevent water vapor transmission.

9. The solid state battery according to claim 1, wherein the resin-free insulating material contains glass and ceramics.

10. The solid state battery according to claim 1, wherein the resin-free insulating material is an insulating inorganic material having no ion conductivity and no electron conductivity.

11. The solid state battery according to claim 1, wherein an outline of each of the positive electrode layer and the negative electrode layer is located inside an outline of the solid electrolyte layer in the plan view.

12. The solid state battery according to claim 1, wherein a corner portion of the protective layer is curved in a sectional view of the solid state battery.

13. The solid state battery according to claim 1, wherein the positive electrode layer and the negative electrode layer are layers that occlude and release lithium ions.

14. The solid state battery according to claim 1, wherein the buffer portion surrounds both of the positive electrode layer and the negative electrode layer in the plan view of the solid state battery, and there is a respective local portion (1) between and in a same plane as the side surface of the positive electrode layer having the positive electrode extended portion and the first external terminal and (2) between and in a same plane as the side surface of the negative electrode layer having the negative electrode extended portion and the second external terminal.

15. The solid state battery according to claim 14, wherein in the plan view, a first side of the respective local portions of the buffer portion are joined to the first external terminal and the second external terminal, and a second side of the respective local portions of the buffer portion are joined to the side surface of the positive electrode layer having the positive electrode extended portion and the side surface of the negative electrode layer having the negative electrode extended portion.

16. A solid state battery comprising:
a battery element including, along a stacking direction, one or more battery constituent units including a positive electrode layer having a positive electrode extended portion, a negative electrode layer having a negative electrode extended portion, and a solid electrolyte layer interposed between the positive electrode layer and the negative electrode layer;
a first external terminal electrically connected to the positive electrode extended portion of the positive electrode layer;
a second external terminal electrically connected to the negative electrode extended portion of the negative electrode layer;
a protective layer covering a surface of the battery element; and
a buffer portion surrounding at least one of the positive electrode layer and the negative electrode layer in a plan view of the solid state battery, wherein at least a local portion of the buffer portion includes a resin-free insulating material substantially identical to a resin-free insulating material of the protective layer, the local portion being (1) between a side surface of the positive electrode layer having the positive electrode extended portion and the first external terminal or (2) between a side surface of the negative electrode layer having the negative electrode extended portion and the second external terminal, wherein the buffer portion surrounds both of the positive electrode layer and the negative electrode layer in the plan view of the solid state battery, and there is a respective local portion (1) between the side surface of the positive electrode layer having the positive electrode extended portion and the first external terminal and (2) between the side surface of the negative electrode layer having the negative electrode extended portion and the second external terminal, and wherein only the respective local portions include the resin-free insulating material substantially identical to the resin-free insulating material of the protective layer.

17. The solid state battery according to claim 14, wherein in the plan view, the buffer portion between the protective layer and both the positive electrode layer and the negative electrode layer includes the resin-free insulating material.

18. The solid state battery according to claim 17, wherein in the plan view, both the buffer portion and the protective layer in contact with the buffer portion include the resin-free insulating material.

19. The solid state battery according to claim 14, wherein in the plan view, (1) the buffer portion located between the positive electrode layer and the second external terminal includes the resin-free insulating material and (2) the buffer portion located between the negative electrode layer and the first external terminal includes the resin-free insulating material.

20. The solid state battery according to claim 14, wherein in the plan view, a whole of the buffer portion includes the resin-free insulating material.

* * * * *